J. P. LEGGETT.
MOTOR VEHICLE TRANSMISSION MECHANISM.
APPLICATION FILED NOV. 13, 1913.
1,117,582. Patented Nov. 17, 1914.
2 SHEETS—SHEET 2.
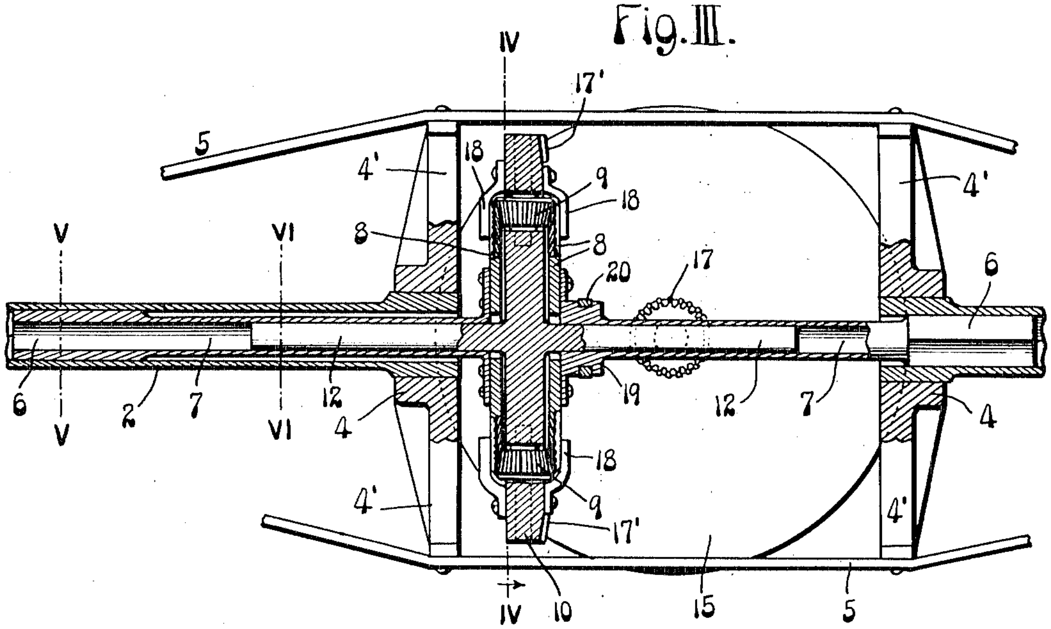
Fig. III.
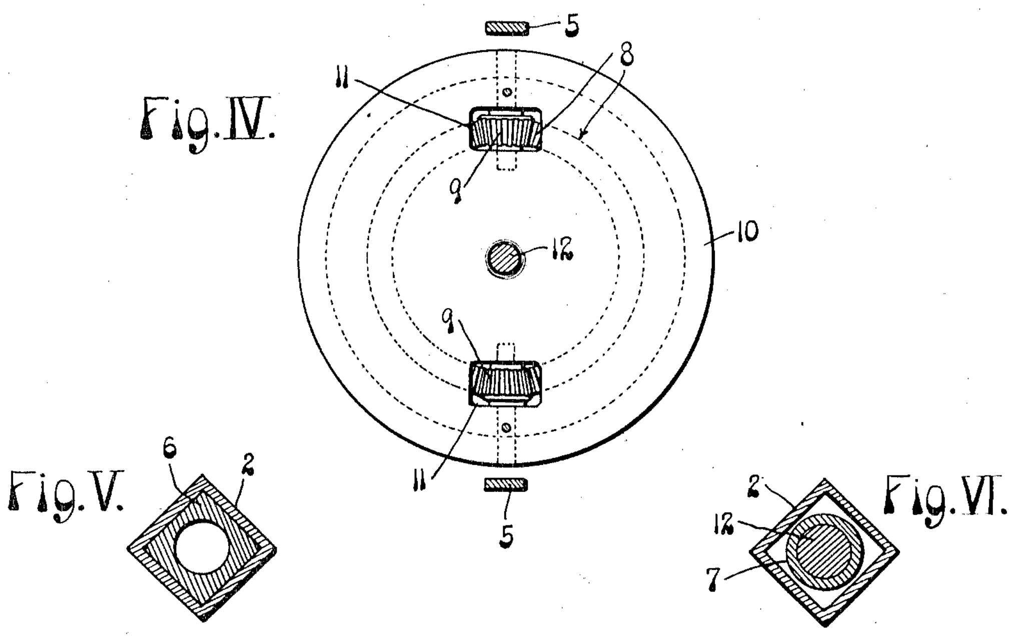
Fig. IV. Fig. V. Fig. VI.
Attest
A. J. McCauley
E. B. Linn
Inventor
J. P. Leggett
by Knight & Cook
Attys.

J. P. LEGGETT.
MOTOR VEHICLE TRANSMISSION MECHANISM.
APPLICATION FILED NOV. 13, 1913.
1,117,582. Patented Nov. 17, 1914.
2 SHEETS—SHEET 1.
Fig. I.
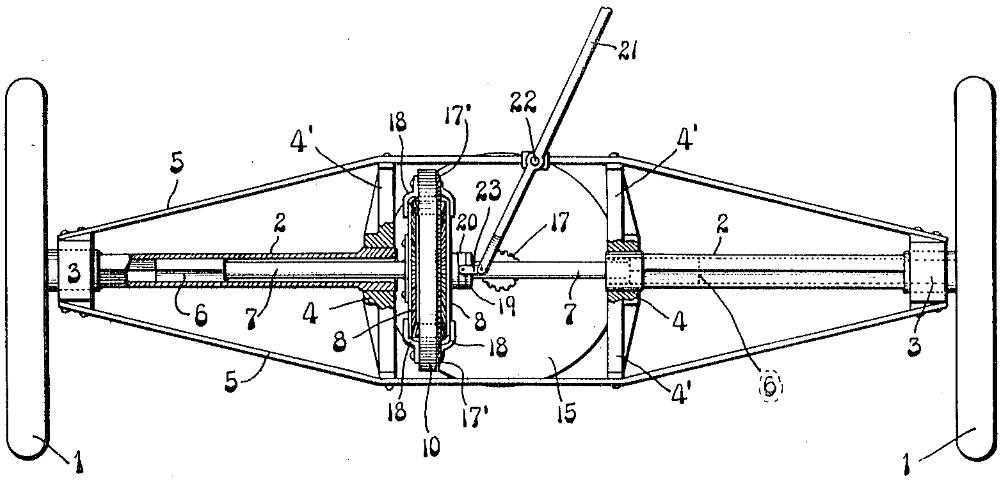
Fig. II.
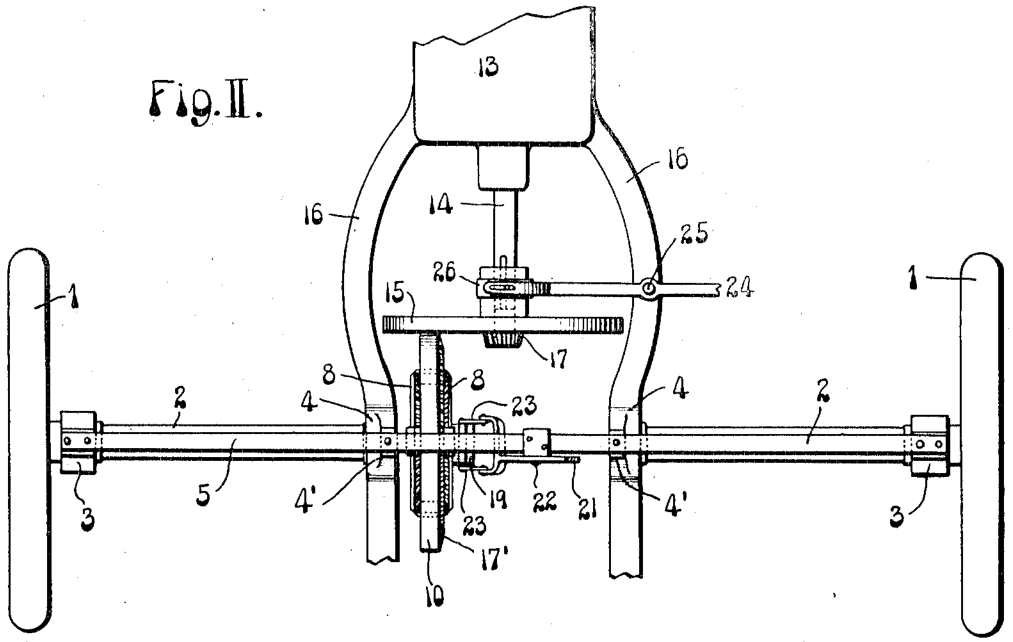
Attest
a. J. McCauley
E. B. Grime
Inventor:
J. P. Leggett
by Knight & Cook Att'ys

UNITED STATES PATENT OFFICE.

JOSEPH P. LEGGETT, OF CARTHAGE, MISSOURI.

MOTOR-VEHICLE TRANSMISSION MECHANISM.

1,117,582. Specification of Letters Patent. Patented Nov. 17, 1914.

Application filed November 13, 1913. Serial No. 800,760.

*To all whom it may concern:*

Be it known that I, JOSEPH P. LEGGETT, a citizen of the United States of America, and a resident of Carthage, in the county of Jasper and State of Missouri, have invented certain new and useful Improvements in Motor-Vehicle Transmission Mechanism, of which the following is a full, clear, and exact description, reference being had to the accompanying drawings, forming a part of this specification.

My invention relates to power transmission mechanism, and has for its object the production of a very inexpensive transmission mechanism for motor vehicles, including differential gearing and axle sections movable to vary the speed of the axle and ground wheels.

Figure I is an elevation, partly in section, illustrating a portion of a motor vehicle equipped with my transmission mechanism. Fig. II is a top or plan view of the parts shown in Fig. I. Fig. III is an enlarged fragmentary view of the drive member, the differential gearing, and the axle sections. Fig. IV is a vertical section taken on line IV—IV, Fig. III. Fig. V is an enlarged transverse section taken on line V—V, Fig. III. Fig. VI is an enlarged transverse section taken on line VI—VI, Fig. III.

In the accompanying drawings: 1 designates ground wheels of a motor vehicle fixed to tubular axle sections 2, the latter being rotatably mounted in bearings 3 and 4. The bearings 4 are preferably provided with arms 4′, forming struts for truss members 5 having their ends secured to the bearings 3. The axle sections 2 are formed with circular portions which lie within the bearings 3 and 4, and each of said axle sections is shaped interiorly to receive a non-circular head 6, formed at the end of an adjustable axle section 7. Each axle section 7 is secured to one of a pair of differential gear wheels 8, and the non-circular heads 6 on said axle sections are slidably fitted to the correspondingly shaped portions of the axle sections 2.

The differential gearing includes pinions 9 arranged between and meshing with the differential gear wheels 8, said pinions being carried by a rotatable driven wheel 10. This driven wheel is preferably a disk, (Fig. IV), provided with openings 11, within which the pinions 9 are mounted. Reinforcing arms or stems 12, extending from the center of the driven wheel 10 are arranged in the axle sections 7 to reinforce the middle portion of the axle structure.

13 designates a motor having a drive shaft 14, and 15 is a drive wheel splined to said shaft. 16 designates a frame extending from the bearings 4 and forming a support for the motor 13. The drive wheel 15 is preferably a friction disk engaging the periphery of the driven wheel 10, and provided with a central pinion 17, adapted to mesh with teeth 17′ at one side of the driven wheel 10. The driven wheel is movable along the face of the drive wheel to vary the speed of the axle, and said driven wheel may be shifted to bring its teeth 17′ into mesh with the pinion 17, or the driven wheel may be shifted beyond the pinion to reverse the movement of the ground wheels and axle.

It will be understood that the differential gearing, as well as the axle sections 7, move with the driven wheel when the latter is shifted along the drive wheel, and the differential gears 8 are therefore confined between arms 18 fixed to the drive wheel. To provide for the shifting of the differential gearing and axle sections 7, one of said axle sections is provided with a collar 19, and a shifter ring 20 is fitted to said collar.

21 designates a shifter lever pivotally supported at 22, and connected by links 23 to the shifter ring 20.

To reverse the direction of movement of the motor vehicle, the driven wheel 10 must be shifted over the axis of the drive wheel 15, and then engaged within the drive wheel 15. It is also necessary to shift the drive wheel 15 to move the pinion 17 out of the path of the driven wheel 10, and this shifting operation is accomplished by a lever 24, (Fig. II), pivoted at 25, and fitted to a shifter ring 26 on the hub of the drive wheel 15.

I claim:—

1. In a power transmission device, a drive member, differential gearing including a driven member movable along said drive member to vary the speed of said differential gearing, axle sections operable by said differential gearing, and reinforcing arms extending from said driven member and fitted to said axle sections.

2. In a power transmission device, a drive member, differential gearing including a driven member movable along said drive member to vary the speed of said differential gearing with respect to the speed of said drive member, axle sections operable by said differential gearing, and reinforcing arms secured to and extending from said driven member and slidably fitted to said axle sections.

3. In a device of the character described, a trussed axle structure including struts and axle sections rotatably mounted in said struts, differential gearing arranged between said struts and provided with rotatable axle sections slidably fitted to the first named axle sections, a drive member for operating said differential gearing, and means for moving said differential gearing along the face of said drive member and between said struts so as to vary the speed of said differential gearing with respect to the speed of said drive member.

JOSEPH P. LEGGETT.

In the presence of—

W. H. WATERS, Jr.,

I. C. HOWSON.